Patented June 13, 1939

2,162,402

UNITED STATES PATENT OFFICE 2,162,402

METHOD OF RUNNING A BLAST FURNACE

Kurt Hörnemann, Essen, Germany

No Drawing. Application February 19, 1938, Serial No. 191,401. In Germany February 20, 1937

6 Claims. (Cl. 75—131)

In blast furnace operation it is customary to use a charge always as nearly as possible uniform in composition, any alloying ingredients being distributed over the several charges of the mixture and introduced with the ore into the blast furnace. With this procedure, a considerable part of the valuable alloying elements are lost for the reason that they enter the slag and are carried off with the same. Furthermore, a change of the nature of the slag introduced by the ore to influence the iron is possible only if large quantities of reacting substances are added.

The present invention relates to a method of introducing alloying ingredients and reacting media such as manganese, chromium, molybdenum, titanium, vanadium, lime, soda, etc., into the pig iron bath and involves the withdrawal of the slag from the blast furnace which is being operated in the usual manner, whereupon the alloying elements are introduced in the lower part of the blast furnace either by the throat or by blowing in, or both ways. This means that the mediums to produce reaction and the alloying elements are to be introduced to the blast furnace only after the slag has been drawn off. The substances in question may be introduced in any suitable chemical or phyiscal condition either by carrying them in the well known manner with a cold or hot air blast or gas into the lower part of the blast furnace, by preference below the belly, or by periodical top charges, i. e., by changing the mixture introduced as regards its weight and composition. The advantages of this method are that the slags no longer will absorb important quantities of valuable substances, making difficult or preventing their being imparted to the pig iron and, furthermore, in that the quantity of slag produced diminishes and that the slag may be prepared or treated in any manner preferred and may be used after its discharge from the furnace to improve the quality of the pig iron. A further important advantage is that by the blowing in method itself an accurately alloyed iron may be melted such as a charge, for instance, of 100 tons of iron with 1% nickel, no losses of iron being incurred, with the result that it is now technically and economically possible to prepare smaller quantities of iron of a definite composition in large blast furnace plants.

To provide for the time needed by the process of reaction, it may be advisable to run the blast furnace intermittently, meaning that the speed of the process may have to be varied even to the point of complete stoppage of the blast. By the blowing-in of valuable substances into the lower part of the blast furnace, it is possible also to reduce dust losses which, in some instances, are quite considerable. The novel method proposed makes it possible, furthermore, to give the pig iron in the blast furnace certain definite characteristics by treating it with slags of different nature. It is to be understood that the measures here suggested may also be taken in combination in such a way, for instance, that periodically several mediums of reaction and alloying ingredients are administered by the throat or by blowing-in either simultaneously or successively. Besides, the discharge of the slag and the forming of a new slag with identical or different additions may be undertaken several times during one and the same tapping of the pig.

Two procedures by which the new method may be put into practice are given hereafter by way of example.

1. After the introduction of 10 loads of coke and ore, 5 loads of coke, ore and manganese ore are brought into the blast furnace, it being understood that, where needed, a suitable quantity of flux such as limestone may be included in the charge. After the melting down of the 10 loads first introduced, the slag formed is drawn off so that now the molten pig iron may get into reacting relation with the remaining 5 loads. With this procedure, only a small percentage of manganese is absorbed by the slag, the incurred loss of this valuable ingredient thus being moderate. After the total of the 15 loads introduced have been melted down, the second formation of slags and the iron are tapped in the usual manner whereupon the same procedure is repeated as described.

2. A large part of the slag formed is tapped off which, owing to its composition, is suited to be used for road ballasting. Then, cold or hot lime in the burnt or unburnt state is blown into the lower part of the blast furnace by means of cold and/or hot air and/or gases. The slag, thereby enriched with lime, is brought into reacting relation with the pig iron desulphurizing it to the degree required. The second slag and the pig are tapped off then and the same procedure is repeated, the second slag being suitable for other purposes such as the production of cement.

I claim:

1. Method for the production in blast furnaces of iron which contains an alloying ingredient such as manganese, chromium, molybdenum, titanium, vanadium, or the like, which consists in the steps of (1) introducing into the blast furnace a charge of iron ore and fuel, (2) operating the blast furnace to reduce the iron ore, forming molten iron and slag, (3) drawing off the slag while retaining the molten iron in the blast furnace, (4) introducing into the blast furnace a secondary charge containing an ore of the alloying metal and fuel, (5) operating the blast furnace to reduce said second charge to metal and slag, and (6) drawing off the resulting metal comprising iron and said alloying metal.

2. The method according to claim 1 wherein the blast furnace while acting upon the secondary charge is operated at a reduced rate.

3. Method for the production in blast furnaces of iron which contains an alloying ingredient such as manganese, chromium, molybdenum, titanium, vanadium, or the like, which consists in the steps of (1) introducing into the blast furnace a charge of iron ore and fuel, (2) operating the blast furnace to reduce the iron ore, forming molten iron and slag, (3) drawing off the slag while retaining the molten iron in the blast furnace, (4) introducing into the blast furnace a secondary charge containing the alloying material (5) operating the blast furnace to assimilate said second charge and (6) drawing off the resulting metal comprising iron and said alloying metal.

4. The method acording to claim 3 wherein the blast furnace while acting upon the secondary charge is operated at a reduced rate.

5. Method according to claim 3 wherein the secondary charge is blown into the blast furnace.

6. Method for the production in blast furnaces of iron which contains an alloying ingredient such as manganese, chromium, molybdenum, titanium, vanadium, or the like, which consists in the steps of (1) introducing into the blast furnace a charge of iron ore and fuel, (2) operating the blast furnace to reduce the iron ore, forming molten iron and slag, (3) drawing off the slag while retaining the molten iron in the blast furnace, (4) introducing into the blast furnace a secondary charge containing the alloying material, (5) assimilating said second charge, and (6) drawing off the resulting metal consisting of iron and said alloying metal.

KURT HÖRNEMANN.